Figure 1:
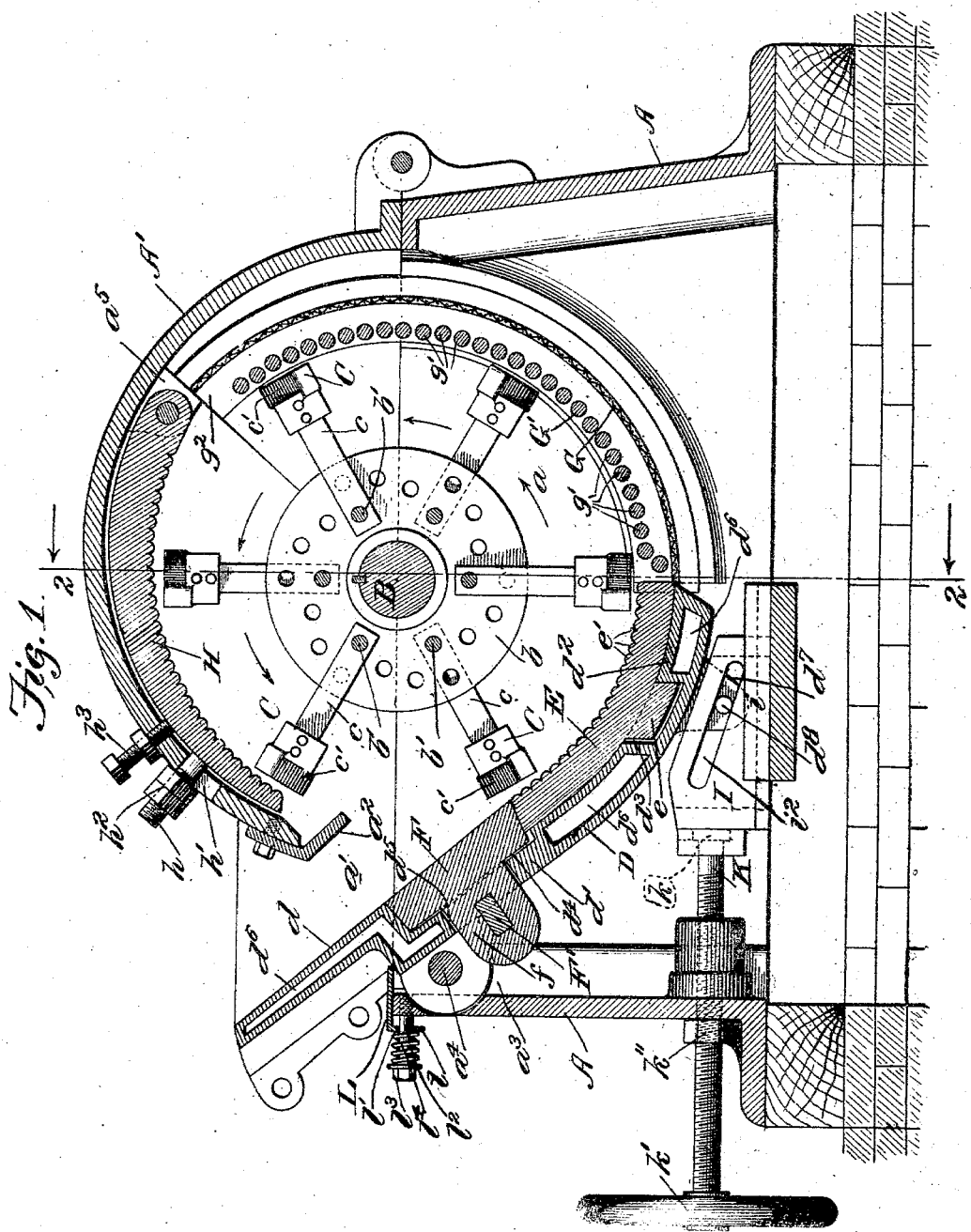

No. 758,288. PATENTED APR. 26, 1904.
M. F. WILLIAMS.
CRUSHER AND PULVERIZER.
APPLICATION FILED DEC. 17, 1901.
NO MODEL. 3 SHEETS—SHEET 1.

Witnesses:
G. A. Pennington
George Bakewell

Inventor:
Milton F. Williams,
by Bakewell & Cornwall
Attys.

No. 758,288. PATENTED APR. 26, 1904.
M. F. WILLIAMS.
CRUSHER AND PULVERIZER.
APPLICATION FILED DEC. 17, 1901.
NO MODEL. 3 SHEETS—SHEET 2.
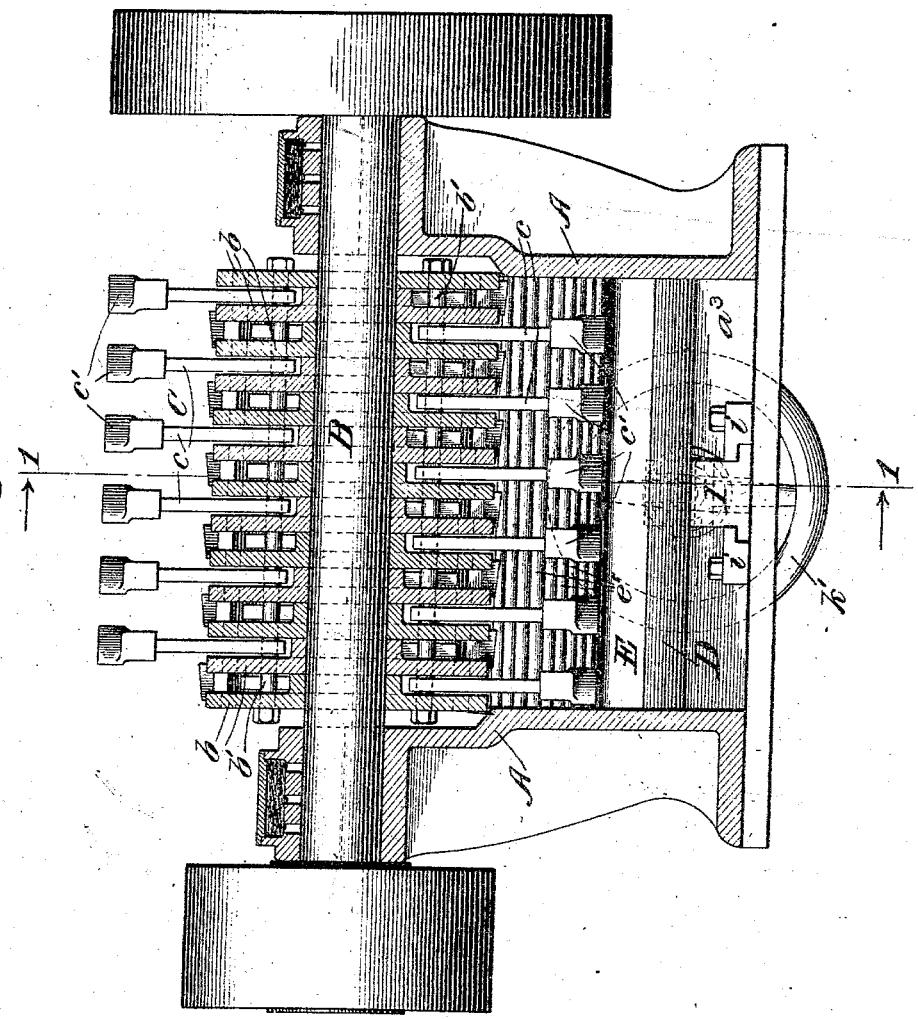
Witnesses:
G. A. Pennington
George Bakewell
Inventor:
Milton F. Williams,
by Bakewell Cornwall
Att'ys.

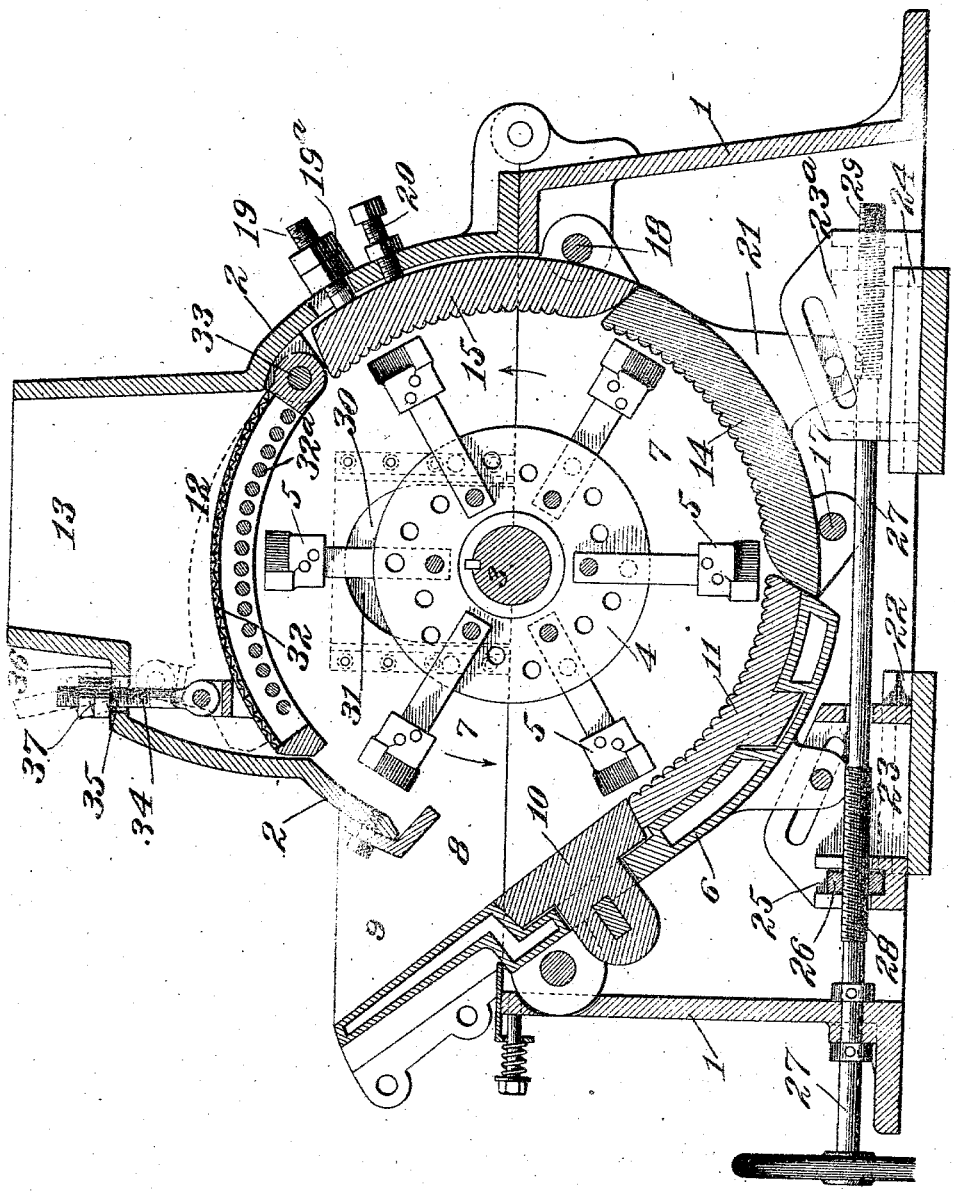

No. 758,288. Patented April 26, 1904.

UNITED STATES PATENT OFFICE.

MILTON F. WILLIAMS, OF ST. LOUIS, MISSOURI, ASSIGNOR TO WILLIAMS PATENT CRUSHER & PULVERIZER COMPANY, OF ST. LOUIS, MISSOURI, A CORPORATION OF MISSOURI.

CRUSHER AND PULVERIZER.

SPECIFICATION forming part of Letters Patent No. 758,288, dated April 26, 1904.

Application filed December 17, 1901. Serial No. 86,250. (No model.)

*To all whom it may concern:*

Be it known that I, MILTON F. WILLIAMS, a citizen of the United States, residing at the city of St. Louis, State of Missouri, have invented a certain new and useful Improvement in Crushers and Pulverizers, of which the following is a full, clear, and exact description, such as will enable others skilled in the art to which it appertains to make and use the same, reference being had to the accompanying drawings, forming part of this specification, in which—

Figure 1 is an elevation chiefly in section on the line 1 1 of Fig. 2. Fig. 2 is an elevation chiefly in section on the line 2 2 of Fig. 1, the cover being removed and the supporting-sills being omitted; and Fig. 3 is a view of the character of Fig. 1, but illustrating a modification.

My present invention relates to crushers and pulverizers, my object being to provide a machine for producing a finely-pulverized finished product; and to this end and also to improve generally upon machines of the character indicated my invention consists in the various matters hereinafter described and claimed.

In the drawings, and referring now particularly to Figs. 1 and 2, A represents a frame open at top and bottom, and A' a cover pivoted thereto at the rear, a cylindrical operating-chamber $a$ being produced by the plates D and H and screen G, to which parts reference will be more fully hereinafter made. Through said chamber extends a shaft B, and upon this shaft are strung hammer-supports $b$, to which the shanks $c$ of hammers C are secured by through-bolts $b'$, said shanks carrying at their outer ends suitable hammer-heads $c'$. A feed-opening $a'$ is left at one side of the chamber $a$, and the casing extends from said opening to produce a suitable feed-hopper. Upon the edge of the cover-plate above the feed-opening is a deflector-plate $a^2$, whose functions are well understood.

Suitably pivoted upon the end walls $a^3$ of the frame and slightly upon the outer side of the feed-opening $a'$, as shown at $a^4$, is a casing-plate D, which extends to the outer side of the pivot to produce the hopper-bottom $d$ and has also an inwardly and downwardly extending portion whose upper part $d'$ is substantially straight, while its lower part $d^2$ curves to substantially conform to the curve of the chamber $a$. This plate can, if desired, be cored, as at $d^6$, to produce a steam-jacket for well-understood purposes. In the lower part $d^2$ of said plate D is an opening $d^3$, which receives a lug $e$ upon the under face of a grinding-plate E, said plate being curved to conform to the curvature of the part $d^2$ and having its upper surface roughened, as by corrugations $e'$. A recess $d^4$ is formed in the upper face of the plate D, the lower edge of said recess being at about the line of the upper edge of the grinding-plate E, and in said recess is placed a breaker-plate or dead-plate F, which has upon its under face a perforated lug $f$, which extends through an opening $d^5$ in the pivoted casing-plate, the perforation of said lug receiving a wedge-key F', by which the breaker-plate is secured firmly in position. The upper wall of the recess, which is, in effect, a shoulder upon the plate, inclines downwardly and inwardly, and both the upper and lower edges of the breaker-plate incline downwardly and toward the center of said plate while the upper edge of the grinding-plate, which abuts against the lower edge of the breaker-plate is beveled downwardly and outwardly, whereby when the breaker-plate and grinding-plate are assembled the locking of the breaker-plate by its wedge-key wedges both the said plates firmly in position, the appropriate wall of the opening $d^3$ forming a shoulder against which the lug $e$ bears.

A guard-plate L closes the opening between the front frame-wall and the plate D, thus preventing material from falling into said opening and also preventing the egress of dust. Said guard-plate extends across the front of the machine and is slidably supported, the inner edge of the plate abutting against the casing-plate D and the outer edge being bent downwardly to produce a lip $l$ through an opening $l'$, in which lip extends a stud $l^2$, seated in the frame. The said stud loosely fits said opening, so that the said guard-plate is freely slidable, and about the stud and between a nut $l^3$ (or other suitable stop member) and the lip is a spring $l^4$, which tends to force the said guard-plate against the casing-plate. Thus in the various adjustments of the said casing-plate the said guard-plate moves with it and always closes the space between the casing-plate and the frame.

The lower edges of the pivoted plate D and of the grinding-plate mounted thereon extend to about the line of the vertical diameter of the chamber $a$ and at this line join a suitably-supported screen G, which is curved to conform to the curve of said chamber and lies in a line outside of the line of the operative face of the grinding-plate, there being a considerable distance between said two lines. Said screen extends a suitable distance about the operating-chamber $a$, and as there is no casing-wall beyond the screen between the lower screen edge and the upper edge of the frame material delivered through the screen can fall into any suitable bin or other receptacle. Upon the inner side of the screen is a cage G', curved to conform to the curve of the operating-chamber and extending substantially the entire length of the screen. The bars $g'$ are closely set and lie in substantially the line of the grinding-surfaces, said bars being preferably supported in the same frame which carries the screen. The top bar is omitted in order to produce an opening $g^2$ for the egress of any material which may be delivered through the spaces between said bars, but of not sufficient fineness to pass through the meshes of the screen.

At its upper end the screen substantially joins a second grinding-plate H, which extends to about the upper edge of the feed-opening $a'$, the end of said grinding-plate near the screen being pivoted upon inwardly-extending lugs $a^5$ upon the cover. Near the free end of said plate is a threaded pin $h$, which projects through a slot $h'$ in the cover and receives set-nuts $h^2$, the inner of which engages the outer face of the cover to effect adjustment of the plate H upon its pivot. A bolt $h^3$, extending through a threaded seat in the cover, bears at its inner end against the outer face of the said plate H, and by properly setting the nuts $h^2$ and the bolt $h^3$ said plate can be adjusted upon its pivot and securely locked in its adjusted position.

A block I slides transverse the axis of the shaft B in suitable ways $i$ and supports the free end of the pivoted casing-plate D, and a threaded adjusting-rod K, extending through and seated in the front frame-plate, has a head $k$ upon its inner end rotatably connected to the block and is provided with a hand-wheel $k'$ upon its outer end. $k''$ is a lock-nut for rod K. A depending lug $d^7$ upon the free end of the casing-plate D has a laterally-projecting stud $d^8$, which enters an inclined slot $i^2$ in the block. Adjustment of the block effects adjustment of the pivoted plate and its supported breaker-plate and grinding-plate in a well-known manner, the engagement of the stud $d^8$ with the respective walls of the slot insuring control of the casing-plate at all times.

The general operation of machines of the type of the present is well known. The material to be acted upon is fed in at the hopper, the rapidly-revolving hammers C breaking the material upon the dead-plate F, and the broken material is then carried around the operating-chamber and ground between the grinding-surfaces and the hammers, the cage-bars $g'$ forming a portion of the total grinding area. The hammer-heads and grinding-surfaces wear away, and in the present apparatus the plurality of grinding-surfaces are separately adjustable, so that each surface can be given the desired adjustment independent of the other, and thus saved from unnecessary wear. Furthermore, by employing grinding-surfaces upon all portions of the periphery of the operating-chamber except that portion used for the inlet-opening the greatest grinding-surface is presented and the maximum amount of work accomplished during a single revolution of the material. By pivoting the grinding-plates as described their operative surfaces can be made to gradually approach the line of travel of the hammer-heads, whereby reduced throats can be produced at the free ends of the grinding-plates and very fine grinding thereby obtained. The plurality of such pivoted plates make it possible to present a plurality of such throats to the material during a single revolution and to produce a very fine product in a short time. The described mounting and interlocking of the breaker-plate F and the grinding-plate E is an efficient one, and by pivoting the plate D at a point removed from the hammers and locating the breaker-plate nearer the pivot any desired adjustment of the grinding-plate can be obtained with but little change in the position of the breaker-plate.

As above described, the screen G is located beyond the line of the grinding-surfaces, so that a considerable space is left between the hammer-heads and the screen, and the cage-bars $g'$ are located in the grinding-line between said screen and the hammers. This saves the screen from grinding wear, thus making it possible to employ a relatively light screen of fine mesh and, furthermore, prevents clogging of the screen by material forced into its openings by the hammers. The screen being located beyond the grinding-line, grinding wear upon the same and the before-mentioned clogging is prevented, even should the cage-bars be omitted. The screen being curved, as previously described, and the pulverized material being thrown tangentially because of the centrifugal force created by the rapidly-revolving hammers, this material is compelled to strike the screen at some angle other than a right angle, and thus a fine sifting can be obtained with a screen of somewhat coarser mesh than that corresponding to the desired fineness of the finished product. Furthermore, the screen being so spaced from the hammer-heads that no grinding action takes place between said members, the pulverized material is merely thrown upon the screen by centrifugal action and not forced upon it by the hammers, and therefore a fine sifting is permitted. The cage-bars produce a sufficient air-space between the screen and the material in the operating-chamber to facilitate the tangential bolting of the ground product.

The apparatus described is strong and has its parts advantageously arranged and combined and by its use a very fine product results.

In the modified construction of machine shown in Fig. 3 there is a frame 1, cover 2, shaft 3, hammer-supports 4, hammers 5, pivoted casing-plate 6, operating-chamber 7, feed-opening 8, and hopper 9, as described in connection with the machine shown in Figs. 1 and 2, the casing-plate 6 carrying the dead-plate or breaker-plate 10 and the grinding-plate 11, as previously explained. In the modified construction, however, the cover 2 (which forms a part of the casing) has a discharge-opening 12 in its top, and from this opening extends an uptake flue or pipe 13. Two grinding-plates 14 and 15 (corresponding generally to the grinding-plate H of the first-described construction) fill the space between the ends of the casing-plate and the hereinafter-described screen 32, said plates thus forming portions of the wall of the operating-chamber, and the end of each of these plates which corresponds to the pivoted end of the casing-plate 6 is pivotally connected to the frame 1, as at 17 and 18, respectively. The plate 15 is adjusted and locked by means of a threaded pin 19, nuts 19ª, and bolt 20, as previously described in connection with the plate H. The plate 14, which lies adjacent the casing-plate 6 and has its pivoted end at the bottom of the machine and near the vertical axis thereof, has a lug 21 depending from the plate portion on the side of the pivot opposite the casing-plate. Slidable in suitable ways 22 below the operating-chamber is a block 23, and in ways 24 in line with the ways 22 is a second block 23ª, the plates 6 and 14 being connected to said blocks in the manner previously described in connection with the casing-plate D, the inclined slot of each block extending downwardly and toward the vertical axis of the machine. Each block is provided with a recess 25, into which is dropped a nut 26, and an adjusting-rod 27 extends through said nuts and has threads 28 and 29 of opposite pitch for engaging the respective nuts. Said rod is seated in and extends beyond the front frame-plate and has a hand-wheel upon its extending portion. The adjustment of the plates 6 and 14 through the medium of the rod 27 will be apparent.

The above-described construction produces a machine having a series of adjacent grinding-surfaces which are pivoted at corresponding ends, whereby a series of reduced throats can be produced and the material thus finely pulverized, as has been heretofore explained.

An opening 30 is made in one or both side walls of the casing at about the center of the operating-chamber, and as the rapidly-revolving hammers act as fan-blades a current of air is drawn in at the said opening or openings and is blown through the discharge-opening in the cover. A gate 31 regulates each of said openings, and thus renders possible the control of the blast. A screen 32, curved to conform to the curve of the wall of the operating-chamber, extends across the discharge-opening and is pivoted to the casing at the end first approached by a hammer in its revolution, as shown at 33, said screen being protected by a grinding-surface cage 32ª. A threaded bolt 34, pivotally connected to the free end of the screen, extends upwardly through a slot 35 made in a shoulder 36, formed upon the pipe 13, and nuts 37 engage the projecting end of said bolt and rest upon said shoulder, whereby the screen can be adjusted and locked in such adjusted position.

The pulverized material carried around by the action of the hammers is thrown by centrifugal force against the screen and strikes the same at an angle other than a right angle, such angular contact being assisted by the curvature of the screen, and a fine sifting results. The finely-pulverized particles which pass the screen are carried out of the machine by the air-blast previously mentioned. Manifestly the fineness of the material passing through a screen is determined by the angle at which the material meets said screen, and therefore as the pivotal support of the screen at its end first approached by the hammers in their revolution makes it possible to adjust the angle of the screen with relation to the tangential line in which the pulverized material is thrown the said screen can be adjusted to effect siftings of different fineness. Furthermore, as the free end of the screen is raised said screen is carried away from the line of rotation of the hammers and the portion of the screen which receives the material is presented farther from the hammers in the tangential line in which the material is thrown. Therefore as the screen is adjusted outwardly on its pivot the material strikes said screen with decreased momentum due to centrifugal force, and consequently the higher the screen is raised the finer the product which passes through the same.

A convenient and satisfactory construction of machine is one in which the screen 32 is made of No. 18 wire, No. 10 mesh. The grinding-bars 32ª are about one-half inch in diameter and are spaced from each other to leave an opening of about one-eighth of an inch between adjacent bars, and said grinding-bars are about one and one-half inches from the screen 32.

I am aware that many minor changes in the construction, combination, and arrangement of the several parts of my device can be made and substituted for those herein shown and described without in the least departing from the nature and principle of my invention.

Having thus described my invention, what I claim as new, and desire to secure by Letters Patent, is—

1. In a machine of the character indicated, the combination with rotatable beaters, of a breaker-plate, an imperforate grinding-surface, and a perforated grinding-surface, said breaker-plate and said grinding-surfaces being arranged in the order named in the direction of travel of said beaters, whereby a beater commencing its travel in coöperative relation to said breaker-plate first passes said breaker-plate, then said imperforate grinding-surface and then said perforated grinding-surface, and a screen upon the outer side of said perforated grinding-surface and spaced therefrom, there being an exit-opening for tailings from the space between said perforated grinding-surface and screen; substantially as described.

2. In a machine of the character indicated, a casing provided with an operating-chamber having a peripheral grinding-surface provided with openings, rotatable beaters coöperating with said grinding-surface, and a screen upon the outer side of said grinding-surface and spaced therefrom, said grinding-surface and screen being pivotally adjustable; substantially as described.

3. In a machine of the character indicated, a plate, a grinding-plate having a part engaging a shoulder on said first-mentioned plate, a breaker-plate having an edge engaging the edge of said grinding-plate upon the side opposite said shoulder, whereby said breaker-plate locks said grinding-plate in position, and means for securing said breaker-plate upon said first-mentioned plates; substantially as described.

4. In a machine of the character indicated, a plate having an opening therein, a grinding-plate having a lug entering said opening, and a breaker-plate secured to said first-mentioned plate and having an edge engaging said grinding-plate and locking the same in position; substantially as described.

5. In a machine of the character indicated, a plate having a shoulder, a grinding-plate supported upon said first-mentioned plate and engaging said shoulder, a beveled shoulder upon said first-mentioned plate, a breaker-plate between said shoulder and said grinding-plate and having an overhanging beveled edge engaging said grinding-plate, and means for securing said breaker-plate upon said first-mentioned plate; substantially as described.

6. In a machine of the character indicated, a plate having two openings therein, a grinding-plate having a lug entering one of said openings, an outwardly and upwardly beveled shoulder upon said first-mentioned plate and upon the side of its second opening opposite the said grinding-plate, a breaker-plate having outwardly and upwardly beveled opposite edges which respectively engage said shoulder and the edge of said grinding-plate, a perforated lug upon said breaker-plate extending through the second opening in said first-mentioned plate, and a wedge-key in the perforation of said lug; substantially as described.

7. In a machine of the character indicated, a frame, a casing-plate pivotally movable with relation thereto, a guard-plate spanning the space between said frame and casing-plate and abutting against said casing-plate, and means for yieldingly forcing said guard-plate against said casing-plate; substantially as described.

8. In a machine of the character indicated, a frame, a casing-plate movable with relation thereto, a guard-plate spanning the space between said frame and said casing-plate, a lip upon said guard-plate, a stud upon said frame and loosely passing through said lip, and a spring between said lip and a stop member upon said stud; substantially as described.

In testimony whereof I hereunto affix my signature, in the presence of two witnesses, this 13th day of December, 1901.

MILTON F. WILLIAMS.

Witnesses:
F. R. CORNWALL,
GEORGE BAKEWELL.